Jan. 18, 1949.   R. L. WITZKE   2,459,607
REGULATING SYSTEM
Filed June 2, 1947
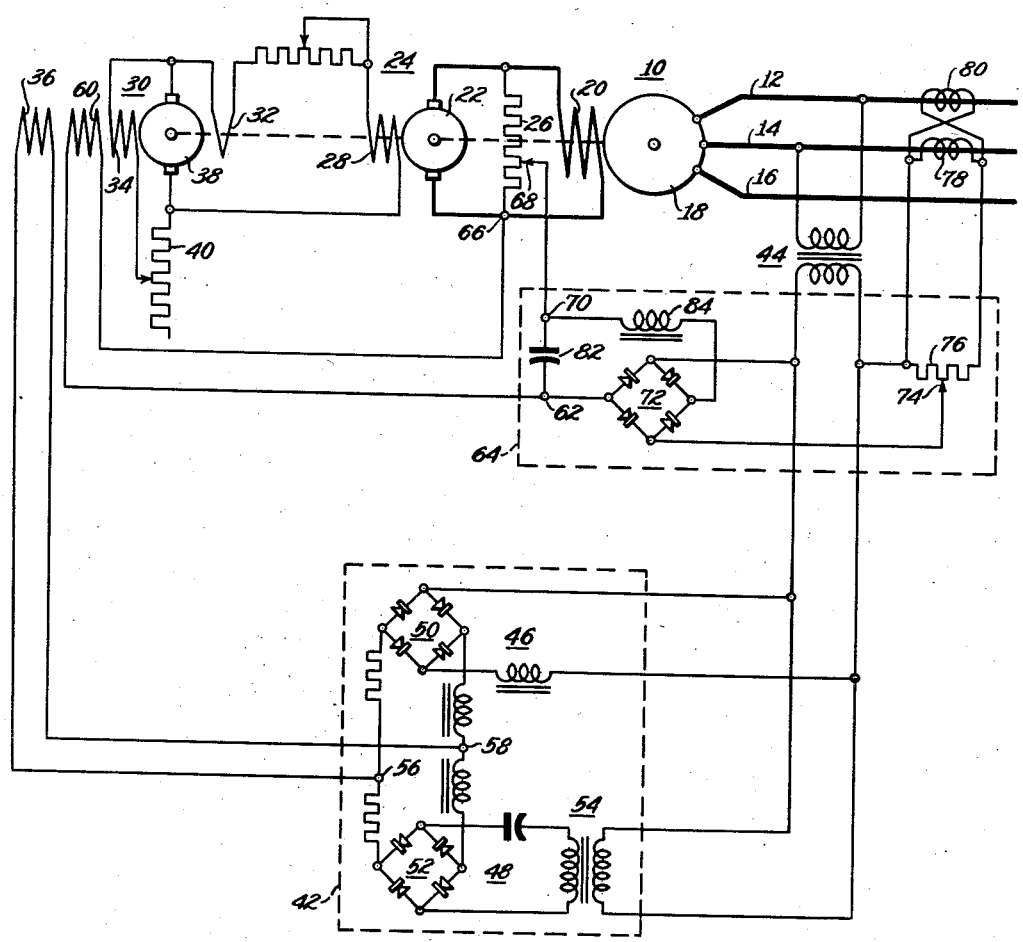
WITNESSES:
Robert Baird
Wm. L. Groome
INVENTOR
Raymond L. Witzke.
BY
James K. Ely
ATTORNEY Patented Jan. 18, 1949

2,459,607

UNITED STATES PATENT OFFICE 2,459,607

REGULATING SYSTEM

Raymond L. Witzke, Pittsburgh, Pa., assignor to Westinghouse Electric Corporation, East Pittsburgh, Pa., a corporation of Pennsylvania Application June 2, 1947, Serial No. 751,809

5 Claims. (Cl. 322—24)

This invention relates to regulating systems.

An object of this invention is to provide a regulating system for a dynamo-electric machine.

Another object of this invention is to provide in a regulating system for a dynamo-electric machine for insuring minimum excitation of the machine.

A more specific object of this invention is the provision in a regulating system for a dynamo-electric machine, of a measuring circuit for giving a direct-current voltage which is an approximation of the watt output of the dynamo-electric machine and utilizing such voltage in cooperation with a measure of the field voltage of the dynamo-electric machine for providing minimum excitation of the dynamo-electric machine.

Other objects of this invention will become apparent from the following description when taken in conjunction with the drawing, the single figure of which is a diagrammatic view of apparatus and circuits embodying the teachings of this invention.

Referring to the drawings, there is illustrated a dynamo-electric machine 10, such as a generator, for supplying a load represented by line conductors 12, 14 and 16. The generator 10 comprises the armature windings 18 connected to the line conductors 12, 14 and 16, and a field winding 20. The field winding 20 is connected across the armature windings 22 of a main exciter 24, a resistor 26 being connected across the field winding 20, the purpose of which will be explained more fully hereinafter. The main exciter 24 is also provided with a field winding 28, the energization of which is controlled by a pilot exciter 30.

In the embodiment illustrated, the pilot exciter 30 is of the self-excited, or "series tuned" type which normally operates along the linear part of its saturation curve. The exciter 30 is provided with a series field winding 32 for normally supplying the majority of the excitation requirements, and a shunt field winding 34 for supplying the remainder of the excitation of the exciter, and a control field winding 36 disposed to be directionally energized in response to the operation of the generator 10, the excitation of which is controlled by the main exciter 24. As illustrated, the series field winding 32 is connected in series circuit between the armature windings 38 of the pilot exciter and the field windings 28 of the main exciter 24, and an adjustable resistor 40 is connected in circuit relation with the shunt field winding 34 for purposes of adjusting the degree of energization. The series field winding 32 and the shunt field winding 34 of the pilot exciter 30 may be cumulative, with the series field winding 32 providing slightly less than required sustaining field strength, and the shunt field windings 34 being only strong enough for adjusting to full self-excitation field strength to compensate for manufacturing differences and installation adjustment, or the like. On the other hand, the shunt field windings 34 may be wound to oppose the series field windings 32 where the windings 32 supply slightly more than required sustaining field strength.

As illustrated, the control field winding 36 is connected through a voltage reference network 42 and a potential transformer 44 to be supplied in accordance with the line voltage. The voltage reference network 42 illustrated is of the type disclosed and claimed in the copending application Serial No. 567,256, filed December 8, 1944, by E. L. Harder et al., now Patent No. 2,428,566, and comprises a non-linear impedance circuit 46 and a linear impedance circuit 48 connected to be simultaneously energized from the transformer 44 in accordance with the line voltage. The non-linear impedance circuit 46 and the linear impedance circuit 48 are connected to rectifiers 50 and 52, respectively, the output terminals of the rectifying units being connected in series circuit relation with each other through suitable series connected resistors and series connected smoothing reactors. An insulating transformer 54 is illustrated as connected in the supply of the linear impedance circuit 48.

The control field winding 36 of the pilot exciter 30 is connected across the direct-current series circuit connecting the rectifier units 50 and 52 at points 56 and 58, respectively, which, for a predetermined line voltage, are at zero potential. The elements of the non-linear impedance circuit 46 and of the linear impedance circuit 48 have intersecting impedance characteristics, and as the line voltage or generator terminal voltage fluctuates from a predetermined value which is to be maintained, the current drawn by the circuits varies, with the result that an unbalanced condition between the output of the rectifying units 50 and 52 occurs, and the control field winding 36 is energized in one or the other directions, depending upon the output of the unbalanced condition.

The pilot exciter 30 is also provided with another control field winding 60 which is disposed to be energized only under certain predetermined operating conditions of the generator 10. As illustrated, the control field winding 60 is disposed to be connected in circuit relation with two sources of direct current voltage, one of the terminals of the control field winding 60 being connected to an output terminal 62 of a measuring network 64, the other terminal of the control field winding 60 being connected through terminal 66, a section of the resistor 26 and the adjustable tap 68 to the other output terminal 70 of the measuring network 64. Thus, the section of resistor 26 connected in circuit relation with the control field winding 60 provides a source of direct-current voltage which is a measure of the voltage across the field winding 20 of the dynamo-electric machine 10.

The other source of direct-current voltage for the control field winding 60 is represented as the output terminals 62 and 70 of the measuring network 64 and is supplied by the full-wave rectifying unit 72, the output terminals of which are connected to the terminals 62 and 70. As illustrated, one of the input terminals of the rectifying unit 72 is connected through the adjustable tap 74, a section of the resistor 76 and the secondary windings of the potential transformer 44 to the other input terminal of the rectifying unit 72. The resistor 76 is connected across current transformers 78 and 80 which are disposed in inductive relation with the line conductors 14 and 12, respectively, so that a current flows through the resistor 76 which is a measure of the generator current. The voltage across the resistor 76 is in phase with the voltage across the secondary winding of transformer 44 when the generator output is at unity power factor. Thus, a voltage is impressed across the rectifying unit 72 which is a composite of the generator terminal voltage, as represented by the potential across the secondary windings of transformer 44, and a potential drop which is a measure of the generator current, as represented by the potential drop across the section of resistor 76 which is connected in circuit with the rectifying unit 72. The resulting direct-current voltage from the rectifying unit 72, as measured across terminals 62 and 70, is an approximation of the watt output of the generator 10. In practice, this approximation is found to so closely follow the watt output that, for the purposes of this invention, such direct-current voltage can be taken as a measure of the watt output of the dynamo-electric machine 10. The capacitor 82 and inductor 84 connected across the rectifying unit 72 are for purposes of smoothing any ripple which may occur in the rectified voltage, in accordance with well-known practice.

The two sources of direct-current voltage previously described and which are utilized for controlling the energization of control field winding 60, are of opposite polarity, it being noted that when the direct-current voltage appearing across terminal 66 and adjustable tap 68 predominates over the direct-current voltage across the terminals 62 and 70, current does not flow in the control field winding 60, since the rectifying unit 72 will effectively block the flow of such current. One the other hand, if the direct-current voltage appearing across terminals 62 and 70 of the measuring network 64 predominates over the direct-current voltage across the section of resistor 26 between terminal 66 and adjustable tap 68, current will flow from the positive terminal of the rectifying unit through the inductor 84, terminal 70, adjustable tap 68, the section of resistor 26 in circuit therewith, terminal 66, control field winding 60 to the terminal 62 and the negative terminal of the rectifying unit 76 to effect energization of the control field winding 60.

In operation, assuming that the generator 10 and the main exciter 24 and pilot exciter 30 are being driven by some suitable means (not shown) for supplying power at a constant voltage to a load (not shown) the windings 32 and 34 of the tuned pilot exciter 30 are sufficient for normally maintaining the excitation of the main exciter 24 and consequently the generator or dynamo-electric machine 10 to maintain constant voltage across the line conductors 12, 14 and 16. As the non-linear impedance circuit 46 and the linear impedance circuit 48 are so selected that at the predetermined line voltage which is to be maintained, the circuits 46 and 48 have intersecting impedance characteristics, and the voltages across rectifying units 50 and 52 and at the points 56 and 58 are equal, a voltage drop does not appear across the control field winding 36.

If, during normal operation of the system, the line voltage should increase from the predetermined value, then the non-linear impedance circuit 46 draws more current than the linear impedance circuit 48, and the output voltages across the rectifying units 50 and 52 are unbalanced. With such an unbalanced condition, the larger potential across the rectifying unit 50 effects a voltage drop across the control field winding 36 in a direction to produce an action to oppose the excitation of the field windings 32 and 34 to decrease the output of the pilot exciter 30 and consequently decrease the excitation of the main exciter 24 with a corresponding decrease in excitation of the generator 10 to return the line voltage to the predetermined value.

If the change in the line voltage is a decrease, then the linear impedance circuit 48 draws more current than the non-linear impedance circuit 46, with the result that the potentials at terminals 56 and 58 become so unbalanced as to effect a voltage drop across the control field winding 36 in a direction to produce an action to aid the field windings 32 and 34 to increase the excitation of the tuned pilot exciter 30 and thereby effect an increase in the excitation of the main exciter 24 with a resulting increase in the excitation of the generator 10 to maintain the line voltage at its predetermined value.

The foregoing description of the operation of the regulating system is for a normal operation of the system wherein the excitation of the generator 10 is maintained at a value above a predetermined minimum excitation. If, in the latter operation just described, the voltage across the generator field 20 is increased with the result that the direct-current voltage appearing across terminal 66 and adjustable tap 68 of the resistor 26 is increased to a value in excess of the direct-current voltage appearing across terminals 62 and 70 which is a measure or an approximation of the watt output of the generator 10, the measuring network 64 has no effect on the control of the excitation of the pilot generator 30, since the rectifying unit 72 effectively blocks the flow of current resulting from such differential between the two sources of direct-current voltage, and current fails to flow in the control field winding 60.

During the operation of the regulating system, the control field winding 36 is energized to oppose the action of the field windings 32 and 34 to effect a decrease in the excitation of the main exciter 24 and consequently a decrease in the excitation of the generator 10. If the voltage across the field winding 20 of the generator 10 decreases to a value below that necessary for obtaining predetermined minimum excitation, then the direct-current voltage appearing across the section of the resistor 26 between terminal 66 and adjustable tap 68 is of a value below that of the direct-current voltage appearing across the terminal 62 and 70 of the measuring network, and since the direct-current voltages are of opposite polarity, the differential of such voltages causes current to flow through the control field winding 60 to so energize the field winding 60 that it aids the action of the field windings 32 and 34 to effect an increase in the excitation of the pilot exciter 30 in opposition to the effect of the control field winding 36 to so boost the excitation of the main exciter 24 as to effectively raise the excitation of the generator 10 to a value above the predetermined minimum excitation value.

As will be appreciated, the resistance of the generator field winding 20 will fluctuate somewhat with temperature changes. In the system described hereinbefore, compensation can be had for such resistance variations by utilizing as the resistor 76, a composition which will have the characteristic of increasing resistance as a function of current and time. While it is appreciated that such compensation will not entirely compensate for changes in the resistance of the field winding 20 with temperature changes, it will, however, be satisfactory for the purposes of this invention.

The system of this invention employs standard components and can be readily duplicated. It is efficient in operation and when taken in conjunction with the voltage regulation obtained through the use of the control field winding 36 provides an efficient control of the operation of the dynamo-electric machine while insuring minimum excitation thereof.

I claim as my invention:

1. In a regulating system for a dynamo-electric machine disposed to supply a load circuit, in combination, an exciter for supplying the field excitation of the dynamo-electric machine, a control field winding for the exciter disposed to be directionally energized, means responsive to a change in condition of the load circuit supplied by the dynamo-electric machine disposed to control the directional energization of the control field winding, means for producing a direct current voltage which is a measure of the watts output of the dynamo-electric machine, means for producing a direct current voltage which is a measure of the voltage across the field winding of the dynamo-electric machine, and means responsive to said first direct current voltage only when said first direct current voltage is in excess of said second direct current voltage to provide excitation of the exciter to maintain the field excitation of the dynamo-electric machine at not less than a predetermined minimum value.

2. In a regulating system for a dynamo-electric machine disposed to supply a load circuit, in combination, an exciter for supplying the field excitation of the dynamo-electric machine, the exciter having a self-energizing winding for normally supplying the field excitation thereof, a control field winding for the exciter disposed to be directionally energized, means responsive to a change in condition of the load circuit supplied by the dynamo-electric machine disposed to control the directional energization of the control field winding, means for producing a direct current voltage which is a measure of the watts output of the dynamo-electric machine, means for producing a direct current voltage which is a measure of the voltage across the field winding of the dynamo-electric machine, and means responsive to said first direct current voltage only when said first direct current voltage is in excess of said second direct current voltage to provide excitation of the exciter to maintain the field excitation of the dynamo-electric machine at not less than a predetermined minimum value.

3. In a regulating system for a dynamo-electric machine disposed to supply a load circuit, in combination, an exciter for supplying the field excitation of the dynamo-electric machine, a control field winding for the exciter disposed to be directionally energized, means responsive to a change in condition of the load circuit supplied by the dynamo-electric machine disposed to control the directional energization of the control field winding, means for producing a first source of direct current voltage which is a measure of the watts output of the dynamo-electric machine, means for producing a second source of direct current voltage which is a measure of the voltage across the field winding of the dynamo-electric machine, the direct current voltages being of opposite sense, and a second control field winding for the exciter connected to said sources of direct current voltage and disposed to be energized by the differential thereof only when the first direct current voltage is in excess of said second direct current voltage to provide excitation of the exciter to maintain the field excitation of the dynamo-electric machine at not less than a predetermined minimum value.

4. In a regulating system for a dynamo-electric machine disposed to supply a load circuit, in combination, an exciter for supplying the field excitation of the dynamo-electric machine, the exciter having a self-energizing winding for normally supplying the field excitation thereof, a control field winding for the exciter disposed to be directionally energized, means responsive to a change in condition of the load circuit supplied by the dynamo-electric machine disposed to control the directional energization of the control field winding, a full wave rectifier for providing a source of direct current voltage, means for connecting the rectifier to the load circuit to impress a voltage on the rectifier that is the sum of a voltage proportional to the terminal voltage of the dynamo-electric machine and a voltage that is proportional to the current flowing in the load circuit, another source of direct current voltage that is a measure of the voltage across the field winding of the dynamo-electric machine, and means responsive to said first direct current voltage only when said first direct current voltage is in excess of said another direct current voltage to provide excitation of the exciter to maintain the field excitation of the dynamo-electric machine at not less than a predetermined minimum value.

5. In a regulating system for a dynamo-electric machine disposed to supply a load circuit, in combination, an exciter for supplying the field excitation of the dynamo-electric machine, the exciter having a self-energizing winding for normally supplying the field excitation thereof, a control field winding for the exciter disposed to be directionally energized, means responsive to a change in condition of the load circuit supplied by the dynamo-electric machine disposed to control the directional energization of the control field winding, a full wave rectifier for providing a source of direct current voltage, means for connecting the rectifier to the load circuit to impress a voltage on the rectifier that is the sum of a voltage proportional to the terminal voltage of the dynamo-electric machine and a voltage that is proportional to the current flowing in the load circuit, another source of direct current voltage that is a measure of the voltage across the field winding of the dynamo-electric machine, and another control field winding for the exciter connected through the rectifier to said another source of direct current voltage, the rectifier being disposed to prevent the energization of said another control field winding except when the direct current voltage across the rectifier is in excess of said another direct current voltage.

RAYMOND L. WITZKE.

REFERENCES CITED

The following references are of record in the file of this patent:

UNITED STATES PATENTS

| Number | Name | Date |
| --- | --- | --- |
| 1,743,797 | Nickle | Jan. 14, 1930 |
| 2,431,252 | Hornbarger | Nov. 18, 1947 |